No. 832,782. PATENTED OCT. 9, 1906.
G. A. FARRALL.
DRAFT EQUALIZER.
APPLICATION FILED NOV. 15, 1905.
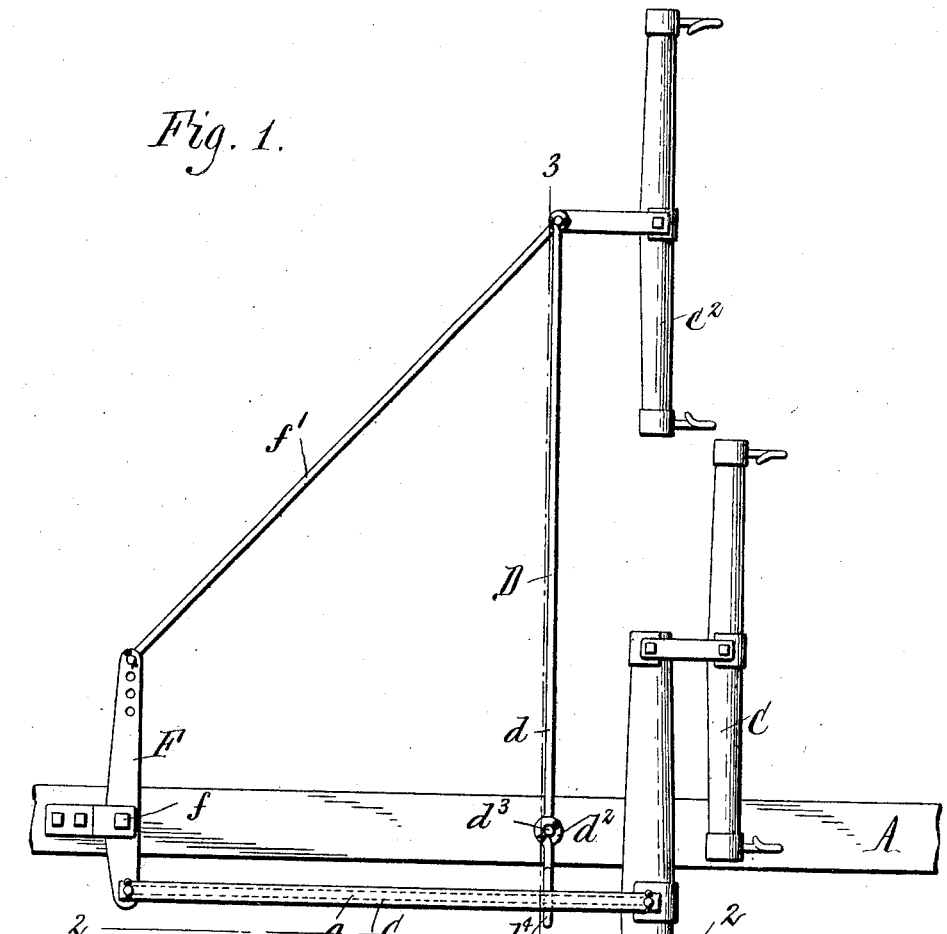
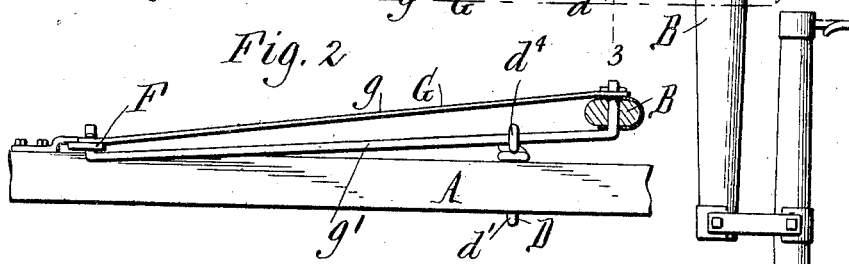
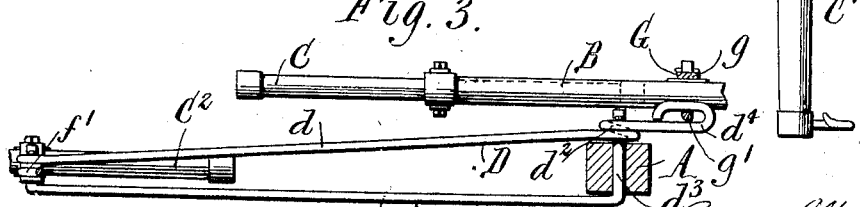
Witnesses:
E. A. Jock.
R. W. Rimser.
Inventor
George Albert Farrall
By Wilhelm, Parker & Hard,
Attorneys.

UNITED STATES PATENT OFFICE.

GEORGE ALBERT FARRALL, OF BATAVIA, NEW YORK, ASSIGNOR TO THE JOHNSTON HARVESTER COMPANY, OF BATAVIA, NEW YORK.

DRAFT-EQUALIZER.

No. 832,782. Specification of Letters Patent. Patented Oct. 9, 1906.

Application filed November 15, 1905. Serial No. 287,469.

*To all whom it may concern:*

Be it known that I, GEORGE ALBERT FARRALL, a citizen of the United States, residing at Batavia, in the county of Genesee and State of New York, have invented a new and useful Improvement in Draft-Equalizers, of which the following is a specification.

This invention relates to draft-equalizers, such as are used with harvesting-machines and agricultural implements to enable a greater number of draft-animals to be hitched on one side of the tongue than on the other side without unbalancing the draft and producing side draft on the tongue.

The objects of the invention are to produce a draft-equalizer of simple, cheap, and durable construction which will nevertheless efficiently equalize the draft and prevent side draft on the tongue, to so construct and arrange the parts of the equalizer as to afford great freedom of movement of the parts without interference and with the minimum chafing and wear thereof and so that the parts on opposite sides of the tongue will balance each other, and to improve the construction of draft-equalizers in the respects hereinafter specified, and set forth in the claims.

In the accompanying drawings, Figure 1 is a plan view of a draft-equalizer embodying the invention. Fig. 2 is a fragmentary longitudinal sectional elevation thereof in line 2 2, Fig. 1. Fig. 3 is a transverse sectional elevation thereof in line 3 3, Fig. 1.

Like letters of reference refer to like parts in the several figures.

A represents the draft-pole or tongue, B a doubletree to the opposite ends of which are connected swingletrees C C' for two draft-animals, and $C^2$ a swingletree for a third draft-animal. These parts may be made of any suitable material and may be of any usual or suitable form and construction.

The doubletree B is arranged over the tongue and projects to opposite sides thereof, so as to locate its attached draft devices or swingletrees C C' on opposite sides of the tongue. The third draft device or swingletree $C^2$ is linked or otherwise attached to the outer end of a spreader or supporting-arm D, which is pivoted between its ends on the tongue and projects laterally to opposite sides thereof. The arm of the spreader carrying the swingletree $C^2$ is considerably longer than the other arm thereof.

F represents an equalizing-lever which is pivoted by a pin $f$ or in any suitable manner on the tongue in rear of the spreader D. One arm of this lever is joined by a link, rod, or other connection $f'$ to the long arm of the spreader D, preferably at the end to which the swingletree $C^2$ is attached, and the other arm of the equalizing-lever is connected centrally to the doubletree B by a link or draft device G, which is supported so as to slide lengthwise and also laterally on the short arm of the spreader D, projecting to that side of the tongue on which the draft-link G is located.

The spreader D is preferably composed of an upper rod $d$, which rests on top of the tongue and is pivoted between its ends thereto in some suitable manner, and a brace-rod $d'$, which is arranged beneath the tongue and is connected at its outer end to the outer end of the upper rod $d$ and at its inner end to the pivot for the spreader. The upper rod of the spreader is bent or coiled between its ends to form an eye $d^2$ for the passage of a pin or bolt $d^3$, by which the spreader is pivoted to the tongue, and one end of the bar is bent upwardly and back upon itself, forming a supporting and guiding loop $d^4$, Fig. 3, for the draft-link G, which carries the doubletree. In the construction shown in the drawings the pivot-pin $d^3$ for the spreader is formed by an integral upright extension of the brace-rod $d'$, and the brace-rod has an upbent portion at its outer end secured in an eye formed at the end of the upper rod $d'$ of the spreader; but this construction may be varied.

The draft link or connection G, joining the doubletree and equalizer-lever for greater strength, preferably consists of an upper bar or strap $g$, having holes in its ends, and a lower rod $g'$, having upbent ends which pass through holes in the lever and doubletree and are secured in the holes in the upper bar or strap by cotter-pins or other means. The upper bar could, however, be omitted, or the link could be made in any other suitable way. The lower rod $g'$ of the draft-link G passes through the loop $d^4$ on the spreader and is adapted to slide endwise in said loop and is also allowed a limited lateral movement therein in the use of the equalizer. The spreader thus supports the draft-link G and the doubletree, and the weight of the link G, doubletree, and swingletrees C C', attached to the doubletree, acting upon the short arm or extension of the spreader at one side of the tongue, counterbalances the weight of the long arm of the spreader and the swingletree attached thereto at the other side of the tongue, and no other means are necessary for preventing the sagging of the long arm of the spreader with its swingletree. By bending or coiling the upper rod $d$ of the spreader to form the pivot-eye $d^2$ the guide-loop $d^4$ for the draft-link G is placed on a higher plane than the long arm of the spreader, and the link G therefore holds the doubletree well up off of the tongue, so that there is no chafing of these parts. This construction also locates the swingletrees C C', carried by the doubletree, in a plane considerably higher than that of the third swingletree, so that considerable movement is allowed the parts without danger of striking and interfering with the equalizing action. The equalizer constructed as described is composed of the minimum number of parts and is therefore inexpensive, light, and desirable. It is at the same time very strong and durable.

The action of the device in equalizing the draft is well understood. The arms of the equalizing-lever connected to the doubletree and swingletree are so proportioned that the load is equally distributed between the three animals and side draft on the tongue is prevented. The lateral play allowed the doubletree also materially lessens the throwing of the tongue from side to side.
While the improvements are described in connection with a three-horse evener, they are not necessarily limited to an equalizer for that particular number of draft-animals.

I claim as my invention—

1. In a draft-equalizer, the combination of a tongue, an equalizing-lever pivoted on the tongue, a rigid spreader pivoted on the tongue and projecting to opposite sides thereof, draft means attached to said spreader at one side of the tongue and connected to one arm of said equalizing-lever, a draft-link connected to the other arm of said equalizing-lever, and draft means attached to said link, said link being supported by and having a sliding connection with said spreader, substantially as set forth.

2. In a draft-equalizer, the combination of a tongue, an equalizing-lever pivoted on the tongue, a rigid spreader pivoted on the tongue and having long and short arms projecting to opposite sides thereof, draft means attached to the long arm of said spreader and connected to one arm of said equalizing-lever, a draft-link connected to the other arm of said equalizing-lever, and draft means attached to said link, said link being supported by the short arm of said spreader and adapted to slide lengthwise and laterally thereon, substantially as set forth.

3. In a draft-equalizer, the combination of a tongue, an equalizing-lever pivoted on the tongue, a spreader-rod crossing the tongue and bent between its ends to form an eye and at one end to form a guide-loop, a pivot on the tongue engaging in said eye, draft means attached to said spreader-rod at one side of the tongue and connected to one arm of said equalizing-lever, a draft-link connected to the other arm of said equalizing-lever and passing loosely through said loop on the spreader-rod, and draft means attached to said draft-link, substantially as set forth.

Witness my hand this 30th day of October, 1905.

GEORGE ALBERT FARRALL.

Witnesses:
 D. W. SPENCER,
 F. E. HOWE.